United States Patent
Henrick et al.

[15] 3,697,560

[45] Oct. 10, 1972

[54] NOVEL COMPOSITION

[72] Inventors: Clive A. Henrick; John B. Siddall, both of Palo Alto, Calif.

[73] Assignee: Zoecon Corporation, Palo Alto, Calif.

[22] Filed: March 29, 1971

[21] Appl. No.: 129,216

[52] U.S. Cl. ................260/399, 260/400, 424/312, 424/318

[51] Int. Cl. ..........................C08h 3/00, C08h 9/02
[58] Field of Search................................260/399, 400

Primary Examiner—Elbert L. Roberts
Attorney—Donald W. Erickson

[57] ABSTRACT

This substituted aliphatic unsaturated esters and derivatives, prepared by the reaction of halide precursor with lower alkylthiol in the presence of base which are useful for the control of insects.

15 Claims, No Drawings

NOVEL COMPOSITION

This invention relates to this substituted aliphatic esters and derivatives thereof of formula A, B and C for the control of insects.

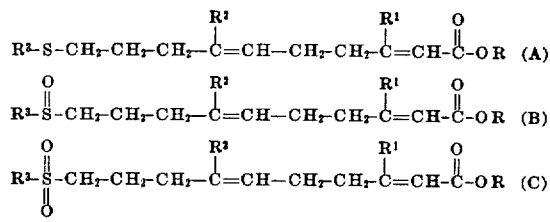

wherein,

R is hydrogen, lower alkyl, cycloalkyl or aralky and each of $R^1$, $R^2$ and $R^3$ is lower alkyl.

The term "lower alkyl," as used herein, refers to an alkyl group having a chain length of one to six carbon atoms.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, mesityl, phenylethyl, methylbenzyl, naphthylmethyl and naphthylethyl of seven to twelve carbon atoms.

The compounds of formula A, B and C are useful for the control of insects. The compounds are applied using either liquid or solid carriers, such as water, acetone, cottonseed oil, xylene, mineral oil, silicon, talc, natural and synthetic resins, and the like. Generally, compositions for application will contain up to about 75 percent of the active compound and more usually less than 25 percent, sufficient composition should be applied to provide from about 0.1 to 50 micrograms of the active compound per insect. Typical insects controlled by the present invention are Diptera, such as mosquitos and houseflies; Hemiptera, such as Pyrrhocoridae and Miridae; Lepidoptera such as Galleria and Plodia; Homoptera; and Coleoptera, such as Tenebrionidae, Crysomelidae and Dermestidae. For example, Pyrrhocoris apterus, Lygus hesperus, Tenebrio molitor, Triboleum confusum, Diabrotica duodecimpunctata, Dermestes maculatus, Aedes aegypti and Musca domestica. Without any intention of being bound by theory, the compounds of formula A, B and C are believed to be effective by reason of hormonal action in that unlike conventional insecticides which are effective by reason of causing immediate death, the compounds of formula A, B and C are effective by reason of physiological changes caused in the treated insect which result in eventual death of the insect and/or inability of the treated insect to reproduce by reason of sterility or abnormal development.

The compounds of the present invention are prepared according to the following outlined synthesis (X is bromo, chloro or iodo):

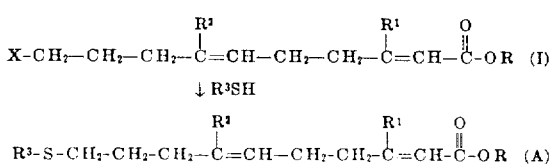

In the practice of the above synthesis, a halide of formula I is reacted with a lower alkyl thiol ($R^3SH$) in the presence of base in an organic solvent to give the thio compound of formula A. Suitable bases include sodium hydride, sodium methoxide, potassium carbonate, sodium ethoxide, and the like. Any organic solvent inert to the reaction can be used such as benzene, dimethylformamide, dimethylacetamide, and the like. Base in excess of the theoretical amount should not be used in order to avoid hydrolysis of the ester moiety, unless, of course, it is desired to form the free acid (R is hydrogen) or the salt thereof.

The sulfinyl compounds of formula B are prepared by treatment of a thio compound of formula A with sodium meta-periodate, hydrogen peroxide, or the like, at a temperature of from about 0° to 20° C for about one to six hours. The reaction usually affords some of the sulfonyl compound of formula C also which can be separated by chromatography, if desired. By using more than one mole of oxidizer, higher temperature and longer reaction time, the formation of the sulfonyl compounds is favored.

The halides of formula I can be prepared from the corresponding hydroxy precursor by treatment with phosphorus trihalide in ether at low temperature. Procedures for the preparation of the hydroxy compounds is described in copending application Ser. No. 73,599, filed Sept. 18, 1970, the disclosure of which is incorporated by reference and Meinwald et al., Tetrahedron Letters, No. 47, p.4893 (1968). Preparation of the halides of formula I can be accomplished also using the synthesis of William S. Johnson, S. African Pat. No. 69/6254.

The following examples are provided to illustrate the practice of the present invention. Temperature is given in degrees Centigrade.

EXAMPLE 1

To a mixture of 0.0734 g. of sodium methoxide and 5 ml. of dimethylformamide, under argon is added 0.102 ml. of ethylmercaptan which is stirred for five minutes with cooling in ice-bath. The ice-bath is removed and stirring continued 0.5 hours at room temperature. This mixture is then added, dropwise, to 0.40 g. of methyl 10-bromo-3,7-dimethyldeca-2,6-dienoate in 5 ml. of dimethylformamide at room temperature over about one hour. The reaction mixture is stirred for 2.5 hours and left 2 days at room temperature. The mixture is then poured into brine and extracted with ether. The ether phase is washed with water and brine, dried over calcium sulfate and evaporated to yield methyl 3,7-dimethyl-11-thiotrideca-2,6-dienoate which is purified by thin layer chromatography.

EXAMPLE 2

The process of Example 1 is repeated using each of the bromides under column I to prepare the respective thio compound under column II.

I ethyl 10-bromo-3,7-dimethyldeca-2,6-dienoate
methyl 10-bromo-3-methyl-7-ethyldeca-2,6-dienoate
ethyl 10-bromo-3-methyl-7-ethyldeca-2,6-dienoate
methyl 10-bromo-3,7-diethyldeca-2,6-dienoate
ethyl 10-bromo-3,7-diethyldeca-2,6-dienoate ethyl 3,7-dimethyl-11-thiotrideca-2,6-dienoate
methyl 3-methyl-7-ethyl-11-thiotrideca-2,6-dienoate
ethyl 3-methyl-7-ethyl-11-thiotrideca-2,6-dienoate
methyl 3,7-diethyl-11-thiotrideca-2,6-dienoate
ethyl 3,7-diethyl-11-thiotrideca-2,6-dienoate

EXAMPLE 3

Following the procedure of Example 1, each of methyl 3,7-dimethyl-11-thiododeca-2,6-dienoate, methyl 3,7-dimethyl-11-thiotetradeca-2,6-dienoate, and methyl 3,7,12-trimethyl-11-thiotrideca-2,6-dienoate is prepared using methyl mercaptan, n-propyl mercaptan and i-propyl mercaptan, respectively.

EXAMPLE 4

To 210 ml. of a 0.5M solution of sodium metaperiodate (aqueous methanol 1/1) at 0° is added 0.1 mole of methyl 3,7-dimethyl-11-thiotrideca-2,6-dienoate. The mixture is stirred at 0° for 4 hours and then filtered to remove precipited sodium iodate. The filtrate is diluted with water and then extracted with chloroform. The extract is dried over magnesium sulfate and solvent removed by evaporation under reduced pressure to give the sulfinyl (methyl 3,7-dimethyl-11-sulfinyltrideca-2,6-dienoate).

EXAMPLE 5

To 200 ml. of aqueous methanol (1/1) containing 0.2 moles of sodium metaperiodate is added 0.1 mole of methyl 3,7-dimethyl-11-thiotrideca-2,6-dienoate. The mixture is maintained at about 30° for 6 hours. After cooling, the mixture is filtered and the filtrate diluted with water followed by extraction with chloroform. The extract is dried over magnesium sulfate and evaporated to give methyl 3,7-dimethyl-11-sulfonyltrideca-2,6-dienoate (C; $R=R^1=R^2=$methyl; $R^3=$ethyl).

EXAMPLE 6

To a mixture of methyl 10-hydroxy-3,7-dimethyldeca-2,6-dienoate (3.44 g.) and 25 ml. of pyridine, cooled in icebath, is added 6 g. of p-tolylsulfonylchloride. The mixture is left overnight at −10°. Then ice water is added and mixture left several hours. The mixture is diluted with aqueous sodium chloride and extracted by ether. Ether extract is washed with water, dilute HCl, water, sodium bicarbonate and brine, dried over calcium sulfate and evaporated to give the corresponding tosylate.

To 0.96 g. of the tosylate in 25 ml. of acetone is added 5 g. of lithium bromide and the mixture stirred overnight at room temperature. The mixture is poured into saturated sodium chloride and extracted with ether. Ether extract is washed with water, dried over calcium sulfate and evaporated to give methyl 10-bromo-3,7-dimethyldeca-2,6-dienoate.

By use of the foregoing procedure, other halides of formula I are prepared.

Another embodiment of the present invention is the di-substitute compounds of formula A', B' and C' which are useful for the control of insects as described for compounds of formula A, B and C hereinabove.

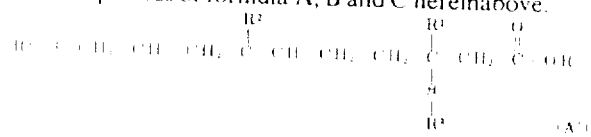

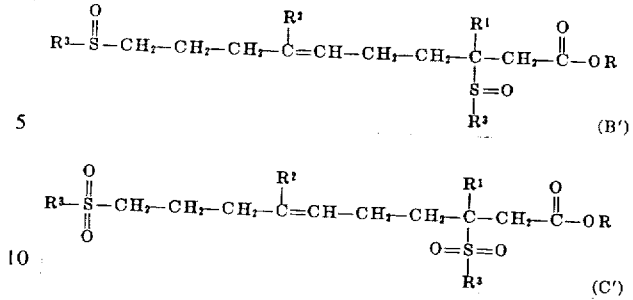

A compound of formula A' is prepared by reacting at least two equivalents of a lower alkyl thiol ($R^3SH$) with the tosylate of a dienoic ester such as the tosylate of methyl 10-hydroxy-3,7-dimethyldeca-2,6-dienoate. The bis-sulfinyl and bis-sulfonyl compounds of formula B' and C' are then prepared by oxidation following the procedure of Examples 4 and 5.

EXAMPLE 7

To a mixture of 0.244 g. of sodium methoxide and 8 ml. of dimethylformamide, under nitrogen and cooled in an ice bath, is added ethylmercaptan (0.60 ml.). The mixture is stirred for 5 minutes and then 1.46 g. of the tosylate of methyl 10-hydroxy-3,7-dimethyldec-2,6-dienoate in 2 ml. of dimethylformamide is added. The reaction mixture is stirred for one hour in an ice bath and then left at room temperature for 22 hours. The mixture is poured into ether-saturated sodium chloride and separated. The organic phase is washed with water, dilute aqueous sodium hydroxide, water and brine, dried over calcium sulfate and evaporated to yield methyl 3,10-(bis)ethylthio-3,7-dimethyldec-6-enoate (methyl 3-ethylthio-3,7-dimethyl-11-thiotridec-6-enoate) which is purified by distillation.

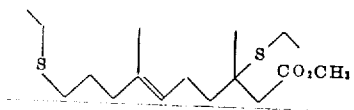

EXAMPLE 8

Following the procedure of Examples 4 and 5, each of methyl 3-ethylsulfinyl-3,7-dimethyl-11-sulfinyltridec-6-enoate and methyl 3-ethylsulfonyl-3,7-dimethyl-11-sulfonyltridec-6-enoate is prepared from methyl 3-ethylthio-3,7-dimethyl-11-thiotridec-6-enoate.

EXAMPLE 9

A. The process of Example 7 is repeated using each of n-propyl mercaptan and methyl mercaptan to prepare methyl 3-n-propylthio-3,7-dimethyl-11-thiotetradec-6-enoate and methyl 3-methylthio-3,7-dimethyl-11-thiododec-6-enoate, respectively.

B. By repeating the process of Example 7 using the tosylate of each of ethyl 10-hydroxy-3,7-dimethyldeca-2,6-dienoate, methyl 10-hydroxy-3-methyl-7-ethyldeca-2,6-dienoate and ethyl 10-hydroxy-3-methyl-7-ethyldeca-2,6-dienoate as the starting material to prepare ethyl 3-ethylthio-3,7-dimethyl-11-thiotridec-6-enoate, methyl 3-ethylthio-3-methyl-7-ethyl-11-thiotridec-6-enoate and ethyl 3-ethylthio-3-methyl-7-ethyl-11-thiotridec-6-enoate, respectively.

What is claimed is:

1. A compound selected from those of formulas A, B and C:

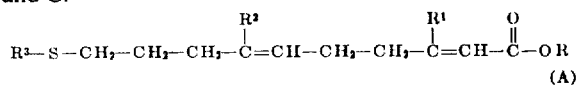
(A)

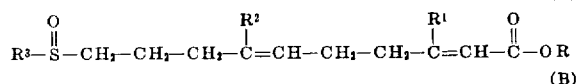
(B)

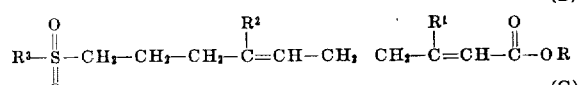
(C)

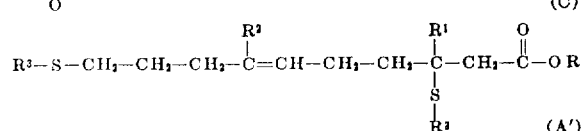
(A')

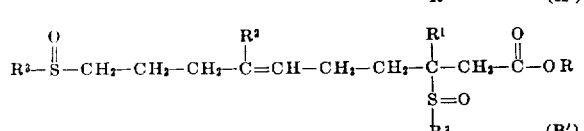
(B')

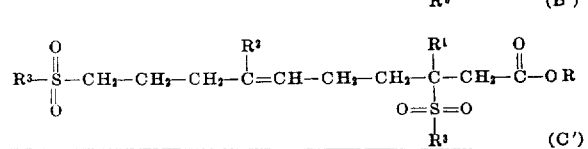
(C')

wherein,

R is hydrogen, lower alkyl, cycloalkyl or aralkyl and each of $R^1$, $R^2$ and $R^3$ is lower alkyl.

2. A compound according to claim 1 wherein each of $R^1$ and $R^2$ is methyl or ethyl.

3. A compound of formula A according to claim 2 wherein $R^3$ is lower alkyl of one to three carbon atoms.

4. A compound according to claim 3 wherein $R^1$ is methyl.

5. A compound according to claim 4 wherein R is methyl or ethyl.

6. A compound according to claim 5 wherein $R^3$ is ethyl.

7. A compound of formula B or C according to claim 2 wherein $R^3$ is lower alkyl of one to three carbon atoms.

8. A compound according to claim 7 wherein $R^1$ is methyl.

9. A compound according to claim 8 wherein R is methyl or ethyl.

10. A compound according to claim 9 wherein $R^3$ is ethyl.

11. A compound of formula A' according to claim 2 wherein $R^3$ is lower alkyl of one to three carbon atoms and R is lower alkyl.

12. A compound according to claim 11 wherein $R^1$ is methyl, $R^3$ is methyl or ethyl and R is methyl or ethyl.

13. A compound of formula B' or C' according to claim 2 wherein $R^3$ is lower alkyl of one to three carbon atoms and R is lower alkyl.

14. A compound according to claim 13 wherein $R^3$ is methyl or ethyl, $R^1$ is methyl and R is methyl or ethyl.

15. A compound according to claim 6 wherein each of R, $R^1$ and $R^2$ is methyl.

* * * * *